United States Patent [19]
Gerard et al.

[11] Patent Number: 6,044,380
[45] Date of Patent: Mar. 28, 2000

[54] APPARATUS AND METHOD FOR MORPHING AN OBJECT ON FIRST TOUCH

[75] Inventors: Scott Neal Gerard; Steven Lester Halter; Steven J. Munroe; Erik E. Voldal, all of Rochester, Minn.

[73] Assignee: International Business Machines Corporation, Armonk, N.Y.

[21] Appl. No.: 09/024,551

[22] Filed: Feb. 17, 1998

[51] Int. Cl.$^7$ .................................................. G06F 17/30
[52] U.S. Cl. .......................................... 707/103; 709/303
[58] Field of Search ................................... 707/103, 203; 709/303; 395/701–702

[56] References Cited

U.S. PATENT DOCUMENTS

| | | | |
|---|---|---|---|
| 5,404,525 | 4/1995 | Endicott et al. | 395/702 |
| 5,664,771 | 9/1997 | Endicott et al. | 395/712 |
| 5,768,588 | 6/1998 | Endicott et al. | 709/303 |
| 5,774,723 | 6/1998 | Endicott et al. | 395/702 |

OTHER PUBLICATIONS

"Theory and Problems of Programming with C + +," by John R. Hubbard, Schaum's Outline Series, McGraw–Hill, 1996, pp. 300–305, Sep. 1996.

*Primary Examiner*—Wayne Amsbury
*Assistant Examiner*—Hosain Alam
*Attorney, Agent, or Firm*—Martin & Associates, L.L.C.; Derek P. Martin

[57] ABSTRACT

An apparatus and method for updating objects sets up morphing on affected classes, and the actual morph of each object is performed the first time the object is touched, i.e., the first time a method on the object is invoked after the morph is set up. Morphing objects on first touch allows an application that requires a new object configuration to be loaded and executed immediately, because new methods and/or data will become available when an instance is first touched. The apparatus and method of the invention set up morphing on first touch by overriding methods on the old class with morph and retry methods that first perform the morph of the object, then route the method call to the newly morphed object. The first touch of an object to be updated thus updates (or morphs) the object, and each subsequent access will be to the updated object.

10 Claims, 6 Drawing Sheets

```
class OldClass

Int a;
    Float b;
        •
        •
        •
Int get_b()
{
    return a;
}
    •
    •
    •
```

```
class OldClass

Int a;
    Float b;
        •
        •
        •
Int get_b()
{
1010 ——— NewClass.morph(this)
1020 ——— return this.get_b();
}
    •
    •
    •
```

APPARATUS AND METHOD FOR MORPHING AN OBJECT ON FIRST TOUCH

BACKGROUND OF THE INVENTION

1. Technical Field

This invention generally relates to object oriented programming and more specifically relates to an apparatus and method for updating objects in an object oriented system.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors, and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object oriented programming promotes the reusability of existing object definitions and promotes more efficient use of program code.

An object in an object oriented computer program typically has attributes defined by state data that determine how the object will behave. State data as used herein defines both methods and data within an object, and is a concept that is well-known to one skilled in the art. If an object is transient, it is created within a process, and terminates when the process ends. If an object is persistent, however, mechanisms are put in place to allow the object to survive the process that creates it so it can be accessed by other processes.

Objects are typically made persistent by storing their state data in a local data store. In many known computer system, the process of making an object persistent is known as "externalization". Externalization is the means or protocol used in object oriented programming for transferring data out of an object. In essence the state data that defines the attributes of an object are "externalized", or written out of the object, into a different format that is easily stored in the local data store. When the object is needed again, the externalized state data is internalized into an object, creating an exact copy of the object as it previously existed.

Computer programs naturally evolve over time. Changing an object oriented program requires changes to objects. When changes to persistent objects are required, there is no uniform mechanism for updating the persistent objects. For example, assume a company has an Employee class that contains the employee's name; address, including 5-digit ZIP code; and home telephone number. Let's further assume that the employee class needs to be updated to incorporate a nine digit ZIP code and to include a department code for the employee. A new class is defined with the additional data fields for the ZIP code and the department. But how is the existing, persistent object updated so that it contains the additional data fields?

Referring to FIG. 2, one known method 200 for updating persistent objects first stores the state of all objects in the system in memory (step 210), generally by externalizing the object data to a data store. Next, all the objects in the system are passivated (step 220). The new class is loaded (step 230), an instance of the new class is created (step 240), and one or more methods on the new class are invoked to retrieve the stored state data (step 250), generally by internalizing the state data into the new instance(s) of the new class. While this method succeeds at updating the persistent objects, it requires that all processes that access the objects to be shut down in order to passivate the objects. With large systems that have thousands or millions of objects, this process can be very time-consuming, and can take a computer system off-line for many hours. Shutting down a large computer system for many hours is an unacceptable solution in many cases. For this reason, a dynamic way of updating objects would be preferred.

Recent developments in object oriented systems allow an object to be updated without being passivated. One such development uses a morph( ) method to perform the metamorphosis of an object from an old class to a new class. For the discussion herein, the term "morph" is used as shorthand for updating an object from a first class to a second class. Each class has a morph( ) method that may be invoked to update an object to a new class without passivating the object. Referring to FIG. 3, a method 300 for updating persistent objects using a morph( ) method starts by building a new class (step 310). Next, all applications that use any of the instances of the old class are stopped (step 320). If the applications were allowed to run during the morphing of the objects, an application could encounter instances of the old class mixed with instances of the new class, which would produce indeterminate results. Next, the morph( ) method is invoked on each persistent object that needs to be updated (step 330). This morph( ) method converts the object from the old class to a new class. Once all of the objects have been updated, the applications are re-started (step 340). This type of system overcomes some of the disadvantages of system 200 of FIG. 2, because the thousands or millions of persistent objects may be updated without passivating the objects. However, the applications that use these objects still must be shut down or locked out while the objects are morphed, which may result in unacceptable down-time for many computer systems.

Method 300 of FIG. 3 may be used to update objects when an application requires new methods or data fields in the object. Once the morph( ) of all applicable objects is complete (step 320), the application may then be run. However, an application that requires updated objects must wait until all of the objects have been morphed before running.

A variation of method 300 might minimize the down-time of certain applications by morphing objects in a background process. This approach would reduce the down-time of the computer system by selecting a relatively small number of objects that need to be morphed, and locking out access to these objects during the morph, which would occur relatively quickly due to the relatively small number of objects involved. In this manner, different applications may be locked from accessing certain objects at certain times, but the time penalty for updating objects is amortized over a longer period using the background process.

All of the methods discussed above for updating persistent objects require an application to be locked out until all objects that the application uses are updated. Locking an application during the updating of all required objects that it references also results in unacceptable down-time for many applications in large-scale object oriented computer systems. Without a mechanism for updating persistent objects without shutting down applications that reference the updated objects or delaying the execution of an application until all referenced objects are updated, the computer industry will continue to suffer from inefficient and costly methods of updating persistent objects in an object oriented computer system.

DISCLOSURE OF INVENTION

According to the present invention, an apparatus and method for updating objects sets up morphing on affected classes, and the actual morph of each object is performed the first time the object is touched, i.e., the first time a method on the object is invoked after the morph is set up. Morphing objects on first touch allows an application that requires a new object configuration to be loaded and executed immediately, because new methods and/or data will become available when an instance is first touched. The apparatus and method of the invention set up morphing on first touch by overriding methods on the old class with morph and retry methods that first perform the morph of the object, then route the method call to the newly morphed object. The first touch of an object to be updated thus updates (or morphs) the object, and each subsequent access will be to the updated object.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
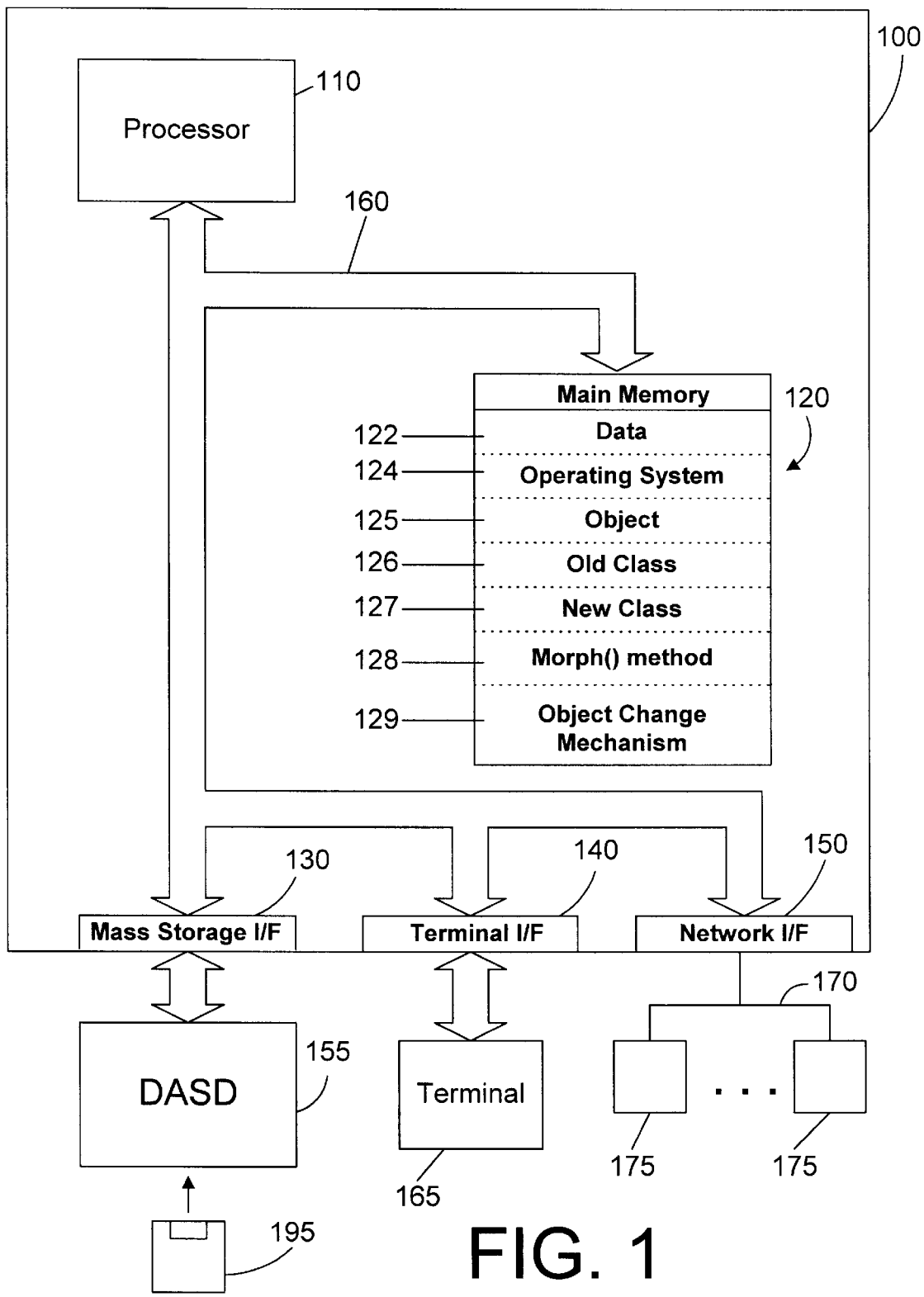
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

2. Detailed Description

According to a preferred embodiment of the present invention, an apparatus and method provide for morphing of objects from an old class to a new class by setting up the morph on the class, with the first method call on an object that needs to be updated automatically causing a morph of the object from the old class to the new class, followed by invoking the method call on the new instance.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, one or more objects 125, an old class 126, a new class 127, a morph( ) method 128, and an object change mechanism 129. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, object 125, old class 126, new class 127, morph( ) method 128, and object change mechanism 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language. Object 125 is an object that needs to be updated. For the purpose of illustrating the subject invention, we assume that object 125 is an instance of a first class called old class 126, and that object 125 needs to be updated to be an instance of new class 127. Note that the terms "object" and "instance" are used interchangeably herein. The morph( ) method 128 is a method that is invoked to update object 125 from the old class 126 to the new class 127. Object change mechanism 129 is the mechanism that sets up a morph to occur on one or more objects that need to be updated. For this simplified example, we assume that object change mechanism 129 sets up the morph on object 125, and that object 125 is then converted from the old class 126 to the new class 127 the first time a method is called on object 125 after the morph has been set up. Morphing an object when a method is called after setting up the morph is referred to herein as morphing on first touch, which means that the first time the object is touched by a method call after setting up the morph, the object will be automatically converted from old class 126 to new class 127.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of object change mechanism 129 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 4:
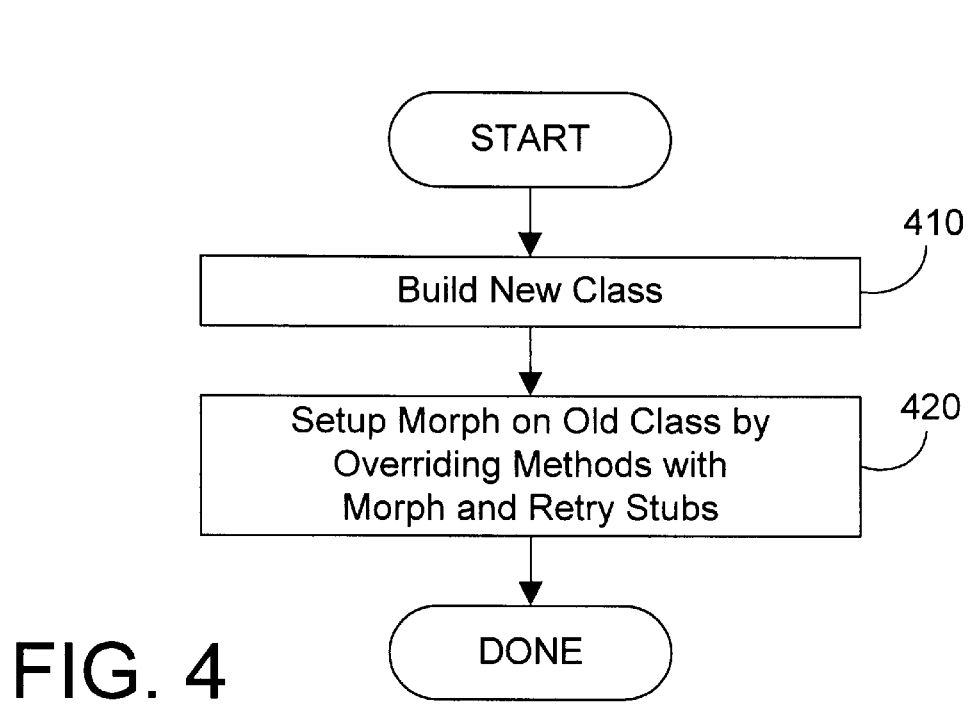
FIG. 4 is a flow diagram of a method for setting up morphing on first touch in accordance with the preferred embodiments of the invention.

The remainder of this specification describes the details of object change mechanism 129 in FIG. 1. Conceptually, object change mechanism 129 effects the morphing of objects on first touch in a two-stage process. The first stage is to set up the morph on a given class, and the second stage causes the morph on first touch of any objects that are instances of the given class. Referring to FIG. 4, object change mechanism 129 performs the steps of a method 400 in setting up the morph. First, the new class is built (step 410). The new class is built according to methods that are well-known in the art. Next, method 400 sets up the morph to the new class by overriding one or more methods on the old class with stubs that perform a "morph and retry" function (step 420). In the preferred embodiment, all methods except the morph( ) method are overridden with morph and retry stubs. These stubs have the same name as the original methods, but perform a morph and retry function when the corresponding method is invoked. At this point the morph has been set up for all instances of the old class.

Once method 400 of FIG. 4 has set up the morph on a particular class, such as old class 126 for our particular example, the first time an instance 125 of old class 126 is touched by a method call, it will be morphed to be an instance of the new class 127. The steps involved in performing a "morph and retry" is illustrated as a method 500 in FIG. 5. "Morph and retry" is a term that describes the function of the stubs that have overridden the methods on old class 126. The "morph" function is carried out by invoking the morph( ) method 128 on the new class 127. This morph( ) method 128 performs the conversion of object 125 from the old class 126 to the new class 127. The "retry" function then invokes the method that was originally called on the instance of the old class 126 on the instance of the new class 127.

The "morph and retry" method 500 is explained below in relation to the specific example of FIG. 1 that has object 125 that is an instance of old class 126 and that has been set up for morphing on first touch to new class 127 by method 400. Morph and retry method 500 begins with the first touch of an instance 125 of old class 126 (step 510), which happens the first time any method on instance 125 is invoked after method 400 of FIG. 4 has set up the morph on old class 126. Because the old methods on the old class 126 were overridden in step 420 of FIG. 4 with morph and retry stubs, invoking the method on the old class (step 510) results in executing the corresponding morph and retry stub (step 520). The "morph" portion of the "morph and retry" method converts the object 125 from its old class 126 to the new class 127 (step 530) by invoking the morph( ) method 128 on new class 127. The morph( ) method 128 is written with a knowledge of new class 127 so that the implementer of the morph( ) method 128 knows how to perform the desired updating from old class 126 to new class 127. Once object 125 has been morphed from the old class 126 to the new class 127, the method that was originally called in step 510 that generated the morph and retry is now invoked on object 125 (step 540), which is now an instance of the new class 127. Step 540 is the "retry" portion of the "morph and retry" method.

Figure 5:
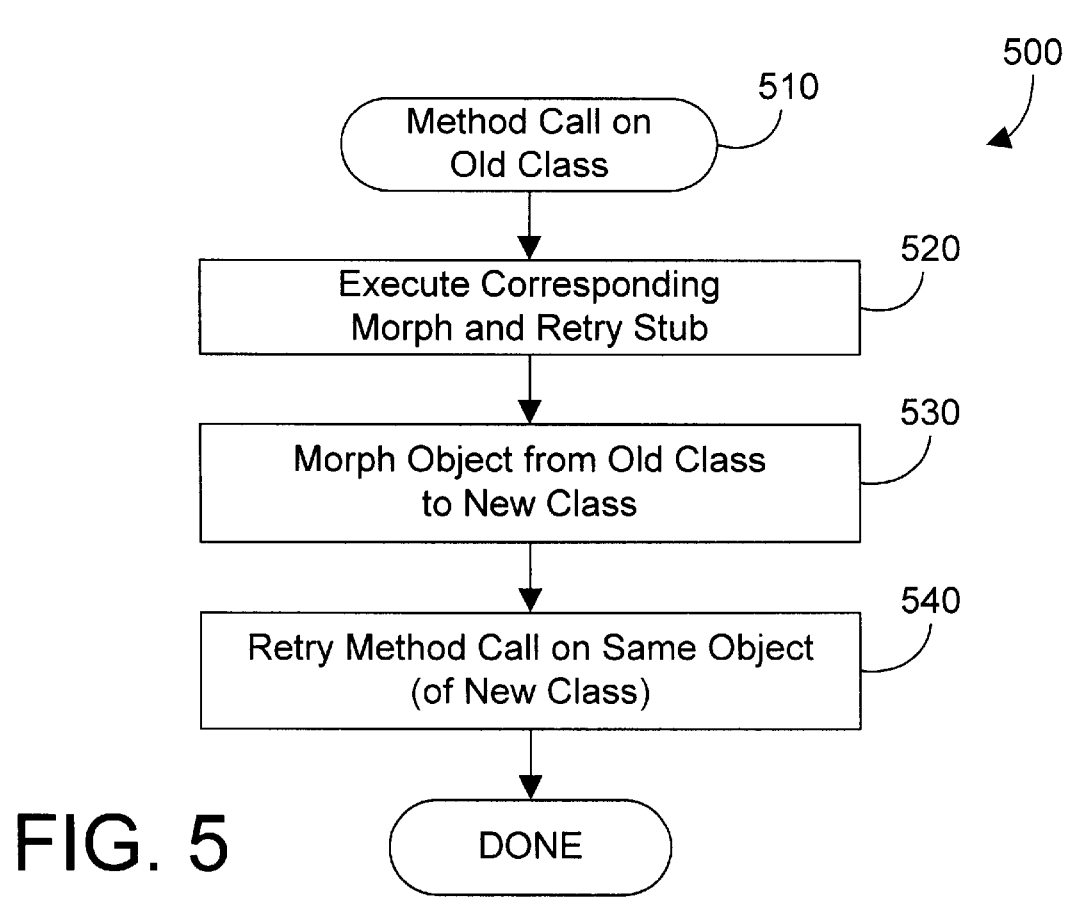
FIG. 5 is a flow diagram of a method for performing morphing on first touch in accordance with the preferred embodiments.
Figure 6:
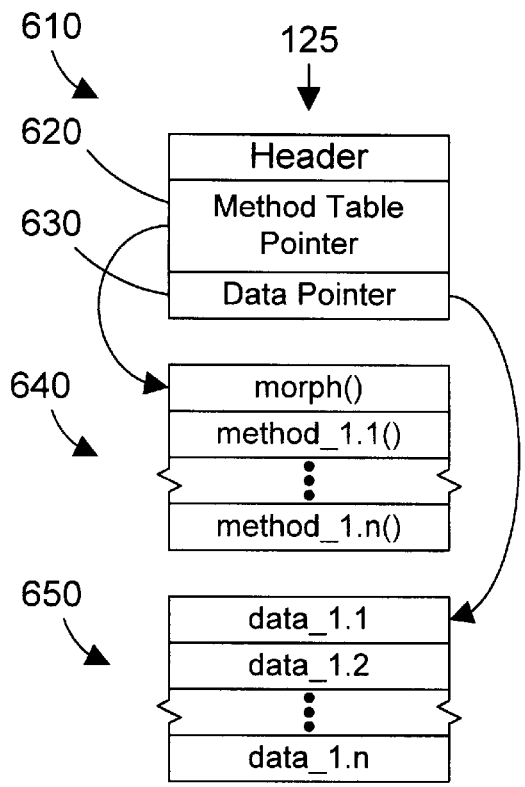
FIG. 6 is a block diagram of an object that is an instance of an old class.
Figure 7:
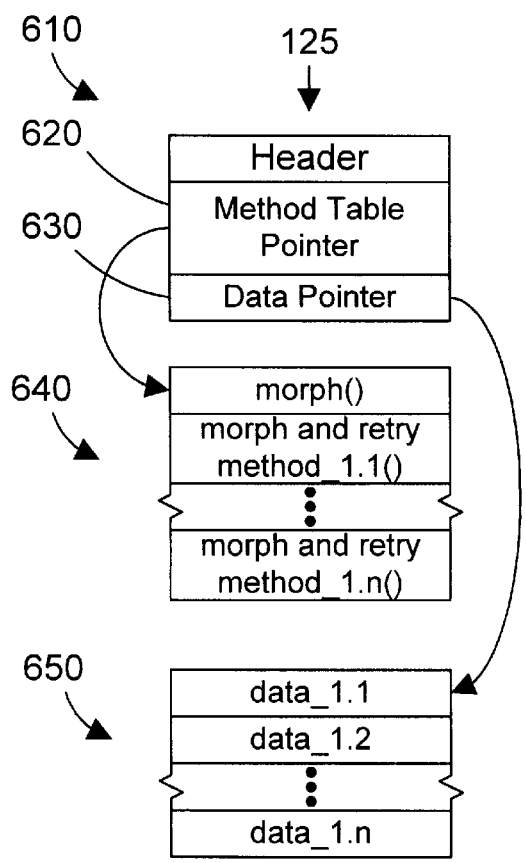
FIG. 7 is a block diagram of the object of FIG. 6 after its methods are overridden by morph and retry methods.
Figures 8, 9, 10:
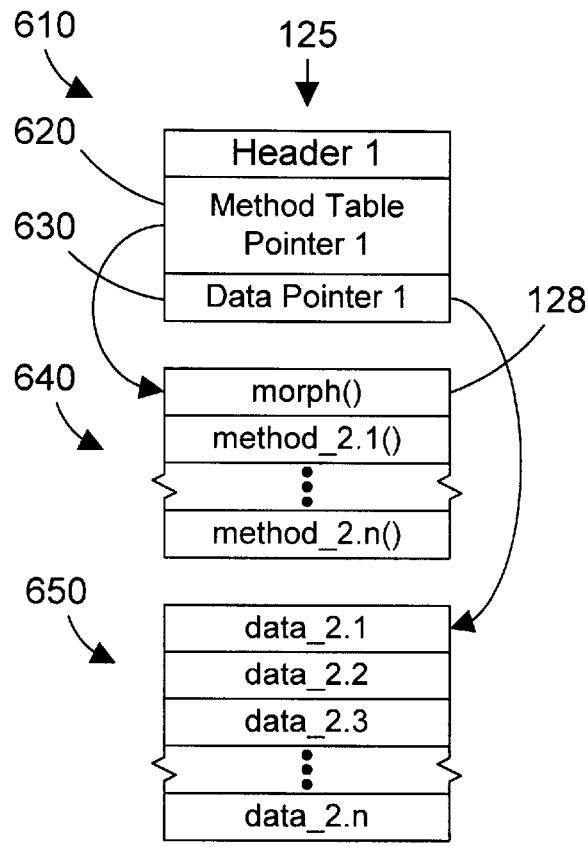
FIG. 8 is a block diagram of the object of FIGS. 6 and 7 after the morph is complete, with the object now being an instance of a new class.
FIG. 9 is a diagram of pseudo-code showing a typical implementation of a "get" method for the object of FIG. 6.
FIG. 10 is a diagram of pseudo-code for a stub that overrides the get method of FIG. 9 and provides the morph and retry function of FIG. 7.

FIGS. 6–8 illustrate the updating of object 125 from old class 126 to new class 127 in accordance with methods 400 and 500 of FIGS. 4 and 5, respectively. Object 125 includes a header portion 610 that contains a method table pointer 620 and a data pointer 630. Method table pointer 620 points to a table of methods 640 for the old class 126, which includes methods 1.1( )–1.n( ). Data pointer 630 points to the data 650 for object 125, which includes data 1.1–1.n. The morph of object 125 is set up by method 400 of FIG. 4. First, the new class 127 is built according to techniques that are known in the art (step 410). Next, the morph is set up on the old class by overriding one or more method calls on the old class 126 with "morph and retry" stubs (step 420). Note that if the new class 127 has more methods than the old class 126, the new methods must be added to the old class 126 during "setup". These new methods will be implemented with morph and retry logic. Referring to FIG. 7, step 420 of FIG. 4 is accomplished by replacing the method pointers in method table 640 with pointers to corresponding "morph and retry" methods. Note that the "morph and retry" methods have the same name as the methods on old class 126, but their logic has been replaced by instructions that implement the morph and retry function of method 500 of FIG. 5. This is the common understanding in the art of how methods are overridden. The labels used in method table 640 of FIG. 7 are not intended to indicate that the methods of old class 126 are replaced by methods with new names, but are intended to indicate that the methods of old class 126 are overridden, keeping their old names, but their internal logic now includes morph and retry logic.

Object 125 of FIG. 7, with its methods overridden by morph and retry stubs, is now configured to morph on first touch. A method call on object 125 in FIG. 7 now corresponds to step 510 in FIG. 5. When the object is first touched by a method call (step 510), the corresponding morph and retry stub is executed (step 520). The first part of the morph and retry stub performs the morph of object 125 (step 530) by invoking the morph( ) method 128 on the new class 127. Invoking the morph( ) method 128 updates the configuration of object 125 from old class 126 to new class 127, as shown in FIG. 8. Note that method table 640 in FIG. 8 now includes methods 2.1( )–2.n( ), which are methods on the new class 127, and data 650 now includes new data 2.1–2.n that is data defined by the new class 127. Object 125 of FIG. 8 is the object after the morph has occurred by invoking the morph( ) method 128 on the new class 127. Next, the method call that caused the morph is retried on the new instance 125 in FIG. 8 (step 540 of FIG. 5). A method call to an object that is an instance of old class 126 thus causes the morph of the object to the new class 127, then performs the method call on the new instance. In this manner, objects are morphed as needed. Note that in a system that supports concurrent access to objects from multiple processes or threads, the morph function will get an exclusive lock on the instance to be morphed at the start of the process, and will hold the lock until the morph is complete.

Pseudo-code illustrating the overriding of methods on old class 126 with "morph and retry" logic is shown in FIGS. 9 and 10. FIG. 9 shows part of the definition of a class OldClass, which represents old class 126. OldClass includes a get_b( ) method, which returns an integer value a. To set up OldClass for morphing, the logic for the get_b( ) method (i.e., the "return a" instruction) is overridden with instructions 1010 and 1020 shown in FIG. 10. Instruction 1010 invokes the morph( ) method on NewClass, which represents new class 127. When the morph( ) method is called, a parameter "this" is passed to indicate to the morph method that the current instance, i.e., "this instance" is to be morphed to NewClass. Instruction 1010 thus performs the morph portion of the "morph and retry" logic. Instruction 1020 then invokes the get_b( ) method on the newly created instance, thereby performing the retry portion of the "morph and retry" logic. A call to a given method on OldClass thus performs the morph of the object to NewClass, then invokes the given method on the new instance.

Figure 2:
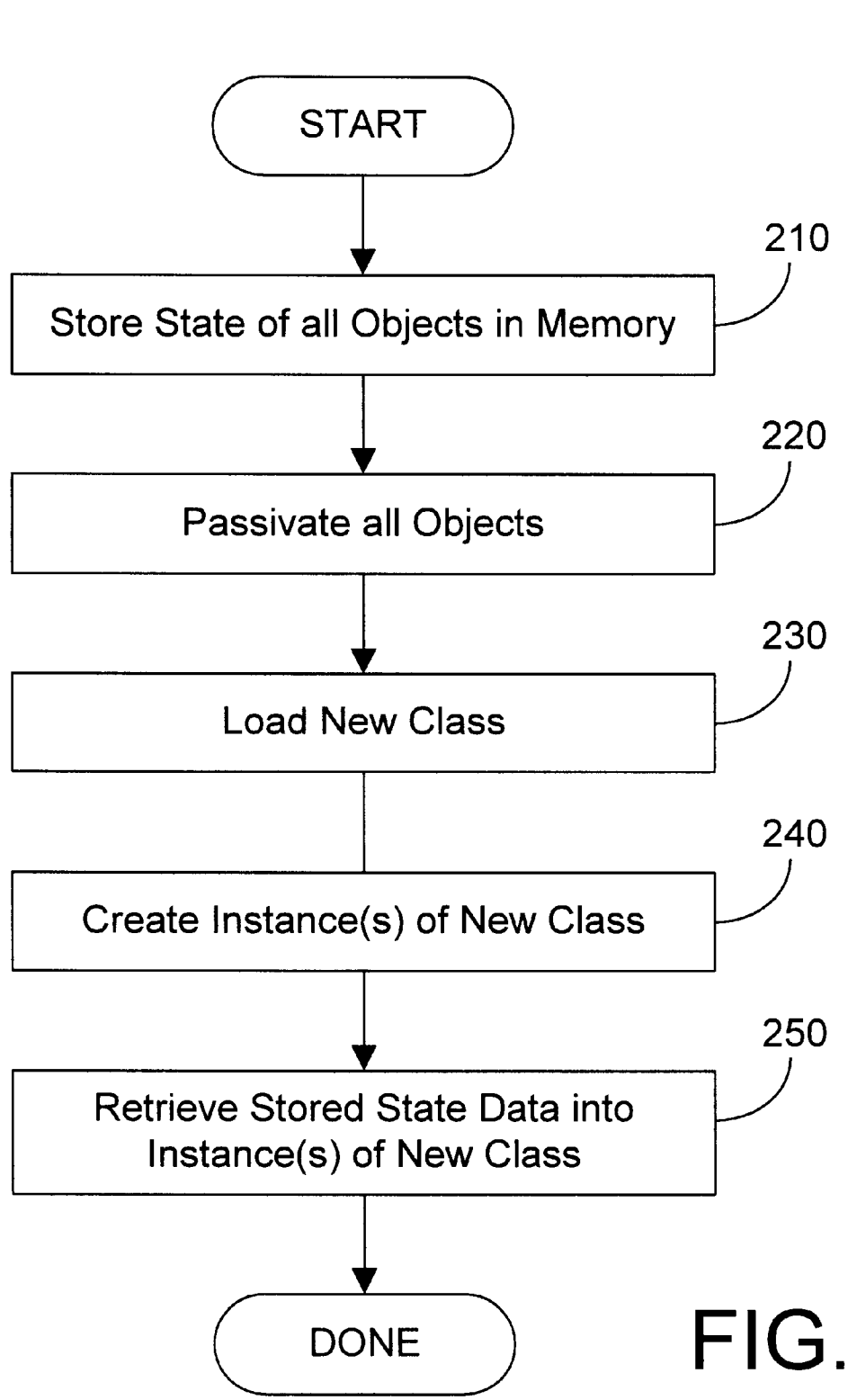
FIG. 2 is a flow diagram of a prior art method for updating objects in an object oriented system.
Figure 3:
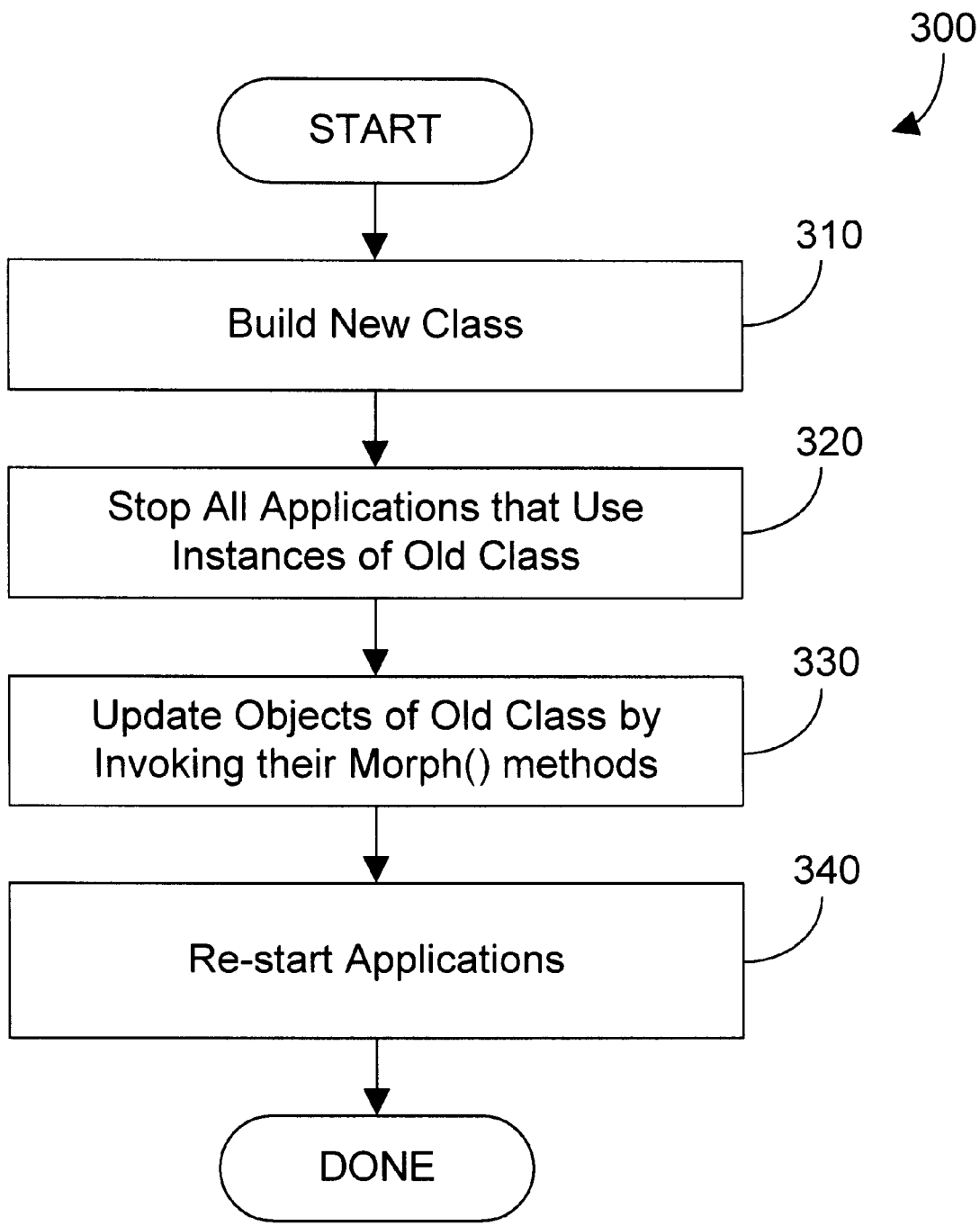
FIG. 3 is a flow diagram of one possible method for updating objects in an object oriented system.

The advantages of methods 400 and 500 over the prior art method 200 of FIG. 2 and the possible implementation 300 of FIG. 3 are substantial. The morph is set up in step 420 on the class that needs to be updated. Access to instances of the class that needs to be updated must be locked out while the morph is set up, but the overhead for setting up the morph on a class is minimal compared to the overhead in locking out accesses until all instances are morphed. The number of classes is orders of magnitude smaller than the number of objects in a large-scale object oriented system. Once the morph is set up on a class, an application that requires the new class may be immediately executed. Each time an instance of the class that needs updating is touched, the instance is morphed to an instance of the new class, and the corresponding method call on the new class is invoked. The apparatus and method in accordance with the preferred embodiments thus allows applications that require instances of the new class to be immediately executed, without having to passivate all the objects as required by method 200 of FIG. 2, and without requiring that applications that require the new class wait until all instances of that class are morphed, as required by method 300 of FIG. 3. Thus, when a class is set up for morphing, a first access to an instance of the class causes the morph and retry logic to execute, while subsequent accesses execute methods directly on the new class.

Implementing a morph on first touch scenario as outlined in the preferred embodiments results in the automatic morphing of objects as they are touched by applications that access the objects. In practical terms, setting up a class to morph on first touch may result in the majority of its instances being morphed as needed by an application. At some point after installing a new class, it may be desirable to remove the implementation of the old class from the system. In order to remove the old class implementation, all instances must be updated to the new class. This means that any objects that have not yet been touched by the application need to be morphed to the new class. One possible way of speeding up the morphing of instances to a new class is to run a process, possibly in the background, that goes through and systematically touches all instances of the old class. Of course, other methods within the scope of the present invention are possible to touch objects and thereby effect a morph to the new class.

One skilled in the art will appreciate that many variations are possible within the scope of the present invention. The preferred embodiment herein overrides all methods on the old class, except for the morph( ) method, with morph and retry stubs. However, it is equally within the scope of the present invention to override only selected methods with the morph and retry logic. For example, a method in accordance with the present invention may only override methods that require data that is only available in the new class. In this scenario, the object would not be morphed if certain methods are called, but would be morphed if any method that is overridden with morph and retry logic is called. In addition, the specification herein discusses setting up a morph on a class in terms of overriding methods with morph and retry stubs. However, one skilled in the art will recognize that alternative ways may exist to reach the same end result of having a call to a method on the old class perform morph and retry logic. For example, the actual code for the methods could be changed, provided that the effect of inheritance is accounted for. The present invention expressly encompasses any and all ways of causing a method call on an instance of one class to automatically morph the instance to a new class, and to invoke the same method on the new class that caused the morph. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:

at least one processor;

a memory coupled to the at least one processor;

an object that is an instance of a first class;

an object change mechanism residing in the memory and executed by the at least one processor, the object change mechanism updating the object to be an instance of a second class by setting up a morph of the object to occur the first time the object is accessed after the morph is set up, wherein the setting up of the morph comprises overriding at least one method on the first class with a call to at least one morph and retry stub that, when executed, updates the object to be an instance of the second class and invokes a method on the instance of the second class.

2. The apparatus of claim 1 further comprising a morph method residing in the memory, executed by the at least one processor, and called by the at least one morph and retry stub to perform the update of the object from the first class to the second class.

3. An apparatus comprising:

an object that is an instance of a first class residing in a memory;

means residing in the memory for setting up a morph on the first class by overriding at least one method on the first class with a call to at least one morph and retry stub that, when executed, updates the object to be an instance of the second class and invokes a method on the instance of the second class; and means residing in the memory for updating the object from the first class to a second class the first time at least one method on the object is called after the means for setting up the morph sets up the morph on the first class.

4. The apparatus of claim 3 wherein the means for updating the object invokes a morph method on the second class to perform the update of the object from the first class to the second class.

5. A method for changing an object that is an instance of a first class to an instance of a second class, the method comprising the steps of:

setting up a morph on the first class by overriding at least one method on the first class with a call to at least one morph and retry stub that, when executed, updates the object to be an instance of the second class and invokes a method on the instance of the second class;

morphing the object from the first class to the second class the first time a method is called on the object after the morph is set up; and calling the method on the morphed object.

6. The method of claim 5 wherein the step of morphing the object from the first class to the second class includes the step of invoking a morph method on the second class to morph the object from the first class to the second class.

7. A program product comprising:

an object change mechanism that updates an object that is an instance of a first class to be an instance of a second class by setting up a morph of the object to occur the first time at least one method on the object is called after the morph is set up, wherein the setting up of the morph comprises overriding at one method on the first class with a call to at least one morph and retry stub that, when executed, updates the object to be an instance of the second class and invokes a method on the instance of the second class; and computer-readable signal bearing media bearing the object change mechanism.

8. The program product of claim 7 wherein the signal bearing media comprises recordable media.

9. The program product of claim 7 wherein the signal bearing media comprises transmission media.

10. The program product of claim 7 further comprising a morph method residing on the signal bearing media, the morph method being called by the at least one morph and retry stub to perform the update of the object from the first class to the second class.

* * * * *